United States Patent

Gold

[11] Patent Number: 5,796,519
[45] Date of Patent: *Aug. 18, 1998

[54] VAN REAR LIGHT-REFLECTING DISPLAY MEANS

[76] Inventor: Peter Gold, 1630-4 Ocean Ave., Bohemia, N.Y. 11716

[*] Notice: The term of this patent shall not extend beyond the expiration date of Pat. No. 5,560,702.

[21] Appl. No.: 664,591

[22] Filed: Jun. 17, 1996

[51] Int. Cl.⁶ .................................... G02B 5/12
[52] U.S. Cl. .................. 359/549; 359/533; 359/548
[58] Field of Search .................. 359/515, 533, 359/538, 548, 549; 296/146.1, 146.5, 146.7; D10/111; D12/190, 196

[56] References Cited

U.S. PATENT DOCUMENTS

| 1,751,070 | 3/1930 | Boots et al. | 359/533 |
| 2,859,662 | 11/1958 | Rider | 359/549 |
| 5,441,324 | 8/1995 | Gold | 296/26 |
| 5,523,926 | 6/1996 | Gold | 362/80 |
| 5,560,702 | 10/1996 | Gold | 362/62 |

Primary Examiner—Paul M. Dzierzynski
Assistant Examiner—John Juba, Jr.
Attorney, Agent, or Firm—Myron Amer PC

[57] ABSTRACT

For a popular dome-shaped industrial van having rear left and right doors, an added visual display strip at the top of the van rear edge to which the doors are hinged, which in the location noted are visible to an oncoming motorist when the doors are open through the clearance bounded by the outwardly diverging van rear edges and upper door edges, thus contributing to safer use during loading and unloading of the industrial van.

2 Claims, 1 Drawing Sheet

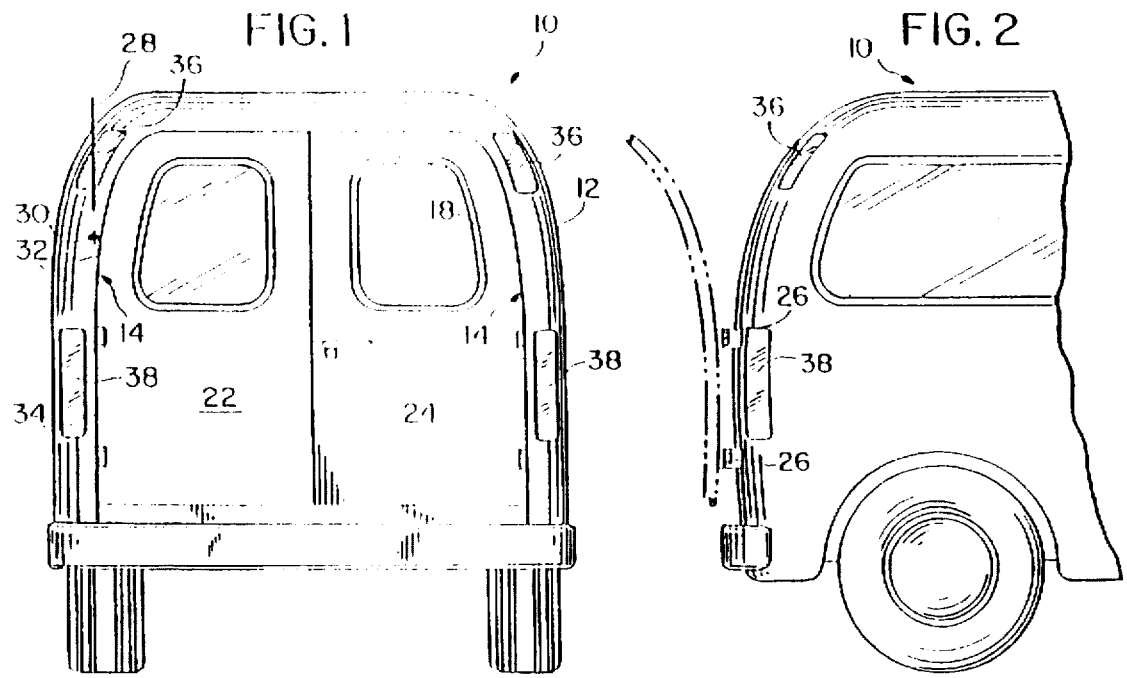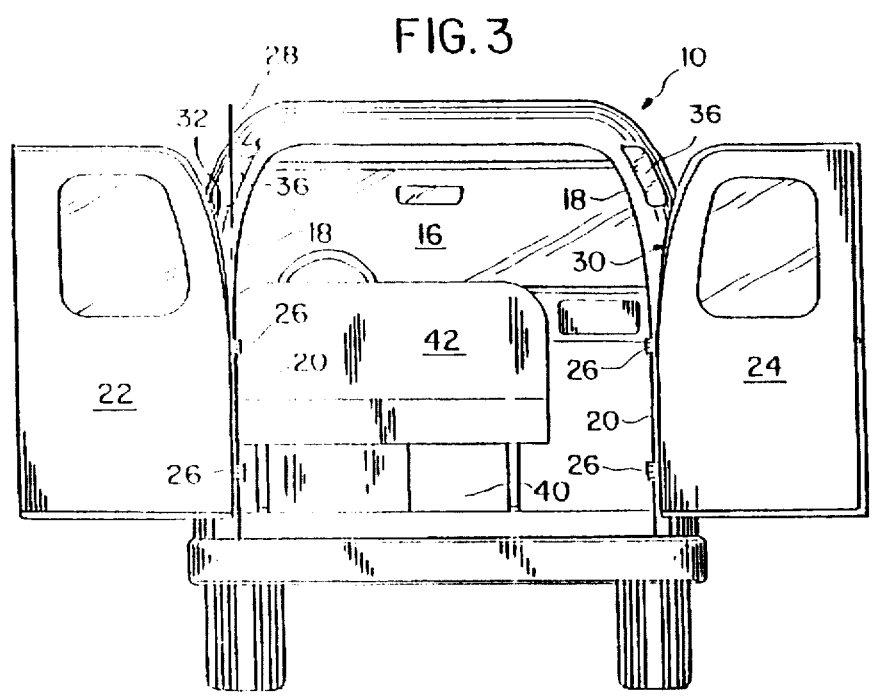

VAN REAR LIGHT-REFLECTING DISPLAY MEANS

The present invention relates generally to improvements for a van rear light display contributing to safer use of the van, and more particularly to a supplementing light-reflecting display by using to better advantage the current construction of a popular van.

EXAMPLE OF THE PRIOR ART

U.S. Pat. No. 3,590,768 for "Combination Decorative and Reflective Strip" issued to Victor Shanok in July, 1971, is exemplary of many prior art patents which position light-reflecting tape in a rearwardly facing relation on an auto, in Shanok's case being about the periphery of the rear window, so that light impinging thereon from the headlights of an approaching motorist provides a visual signal having a significant safety function.

The rear window position of Shanok and all other known positions selected for the light-reflecting tape or like means is herein significantly improved upon to the end of correspondingly improving on safer use of a van, particularly when the van is parked and being loaded or unloaded.

SUMMARY OF THE INVENTION

Broadly, it is an object of the present invention to supplement the rear light display of a van of a popular type having a trapezoidal-shaped roof with an additional visual display signalling its presence to an oncoming motorist, and overcoming the foregoing and other shortcomings of the prior art.

More particularly, it is an object to use to advantage as a site for the additional visual signal the trapezoidal shape of the van, thus completing the embodiment of the additional visual display, with minimum expense, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claim.

BRIEF DESCRIPTION OF THE DRAWINGS

FIG. 1 is a rear view of a van having a rear visual display means according to the present invention;

FIG. 2 is a partial side elevational view of the rear of the van of FIG. 1 illustrating in phantom perspective a van rear door in an open condition; and FIG. 3 is a similar rear view of the van of FIG. 1, but illustrating the rear doors thereof in an open condition.

DETAILED DESCRIPTION OF THE DRAWINGS

The within illustrated van, generally designated 10, is of the type embodied with a stylish appearance presenting a rear wall means 12 having left and right side edges, each generally designated 14, bounding opposite sides of a cargo compartment access opening 16, of which a top or upper length portion 18 is of a trapezoidal or angular orientation and of which a bottom or lower length portion 20 is of a vertical orientation. Left and right doors 22 and 24 (as seen by an approaching motorist) are mounted in a well understood manner for pivotal movement between closed positions (FIG. 1) and open positions (FIG. 3) respectively closing and opening the cargo-access opening 16, on hinges 26 located on the lower vertical length portions 20, said hinges 26 establishing a rotational axis 28 of a vertical orientation.

Each door 22, 24 has a side edge, generally designated 30, which correspondingly has a top or upper length portion 32 of similar trapezoidal or angular orientation as that of wall means 12 and a bottom or lower length portion 34 also of similar vertical orientation such that, as best understood from FIG. 1, when the doors 22, 24 are closed, the respective top length portions of the wall means edges and door edges 18 and 32, are in a contiguous relation to each other and are located on the same side of the vertical rotation axis 28. However, as best understood from FIG. 3, when each door 22, 24 is urged through a pivotal traverse into its open condition, the wall means edge top length portion 18, of course, being stationary, remains in its FIG. 1 relation to the rotation axis 28, but the door edge top length portion 32 assumes a position, as illustrated, on an opposite side of the rotation axis 28 and is thus in a lateral clearance position from the wall means edge length portion 18.

The displacement of the just noted edges 18 and 32 on opposite sides of the rotation axis 28 is used to advantage in accordance with the present invention by the embodiment in a position adjacent the wall means top edge 18 of a second visual display means 36 to supplement a first light means 38 of the van 10, wherein the first light means 38 effective to signal the presence of the van 10 to an approaching motorist when the doors are closed, is not effective in doing so when the doors are open, thus has the second visual display means 36 take over or supplement the first light means 38 by providing a visible display to an oncoming or approaching motorist. In that the doors 22, 24 are frequently open, as when cargo is placed into or removed from cargo storage spaces 40 or passengers use the access opening in relation to seating 42, the second visual display means 36 is of a significant utility by contributing to safer use of the van 10. Safety is also enhanced in that in the closed position of the doors 22 and 24, both the first and second visual display means 38 and 36 are effective display signals to approaching motorists.

The second visual display means 36 of choice will be understood to be a reflective tape as described and illustrated in the Shanok patent 3,590,768 issued in July, 1971, which, by this reference is incorporated herein in its entirety, or any commercially available reflective tape such as supplied by DupliColon Products Co., Elk Grove Village, Ill., having a painted reflective surface of a type currently used for marking roadside obstacles, hazards, curbs and parking areas.

It is contemplated that display means 36 would be purchased as an article of manufacture and, in the so-called aftermarket to an O.E.M. (Original Equipment Manufactured) van 10 of the described requisite shape appropriately attached, adhesively or otherwise, in the locations illustrated in FIGS. 1 and 3 providing both closed and open door presence, to thereby contribute to safer use of the van 10.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A van rear light-reflecting display comprising:

a van rear wall having at least one side edge bounding a rear opening characterized by an upper length portion of an angular orientation and a lower length portion of a vertical orientation;

at least one door for opening and closing said rear opening having a side edge, when in a closed position, of upper and lower length portions of a contiguous relation to said wall one said side edge;

hinge means for interconnecting said one door to said wall one said side edge along confronting lower length portions thereof, effective to establish a rotational axis of a vertical orientation which is displaced laterally of both said wall upper length portion edge and said upper length portion of said door in said closed door position and, in an open condition of said door, effective to displace said upper length portion of said door on an opposite side of said rotation axis for bounding a clearance between said upper length portion of said door and said rotation axis; and a rear light-reflecting display located on said rear wall so as to be visible through said clearance to an approaching motorist, whereby during use of said van rear opening, as occurs when said door is in an opened condition, there is light reflected rearwardly through said clearance, signaling the presence of said van to an approaching motorist.

2. The rear light-reflecting display means for a van as claimed in claim 1 consisting of an attached article of manufacture characterized by a reflective surface.

* * * * *